Patented May 10, 1932

1,857,232

UNITED STATES PATENT OFFICE

ROBERT BERLINER, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW VAT DYESTUFFS OF THE ANTHRAQUINONE SERIES

No Drawing. Application filed February 27, 1931, Serial No. 518,910, and in Germany February 28, 1930.

The present invention relates to new vat dyestuffs of the anthraquinone series.

In accordance with the invention new valuable vat dyestuffs of the anthraquinone series are obtainable by reacting upon an anthraquinone acridone of the probable formula:—

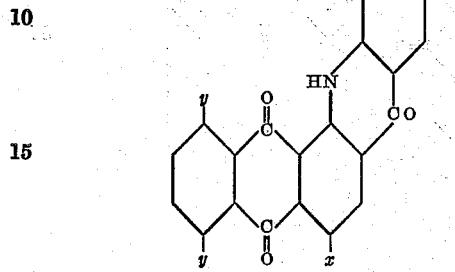

wherein the $x$'s mean halogen, one $y$ means hydrogen and the other halogen, with alpha-aminoanthraquinone in the presence of a high boiling organic solvent, such as nitrobenzene, naphthalene, etc. and in the presence of a suitable acid binding agent (sodium acetate-magnesium oxide; for example) and of a copper catalyst, such as copper powder, copper acetate, copper chloride, cuprous bromide etc. Reaction takes place while heating the reaction mixture and the reaction products separate as soon as they have been formed.

The same products are obtainable by condensing in a similar manner as described above alpha-chloroanthraquinone or alpha-bromoanthraquinone with a compound of the probable formula:—

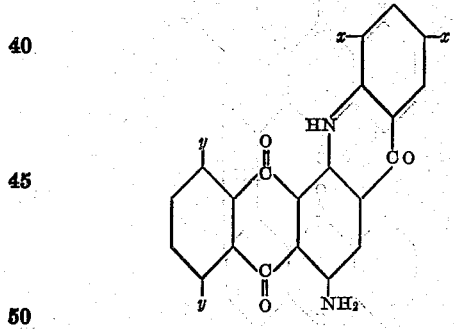

wherein the $x$'s mean halogen atoms, one $y$ stands for hydrogen and the other $y$ for the amino group.

The products thus obtainable which are to be considered as intermediate products in the manufacture of my new vat dyestuffs correspond to the probable formula:—

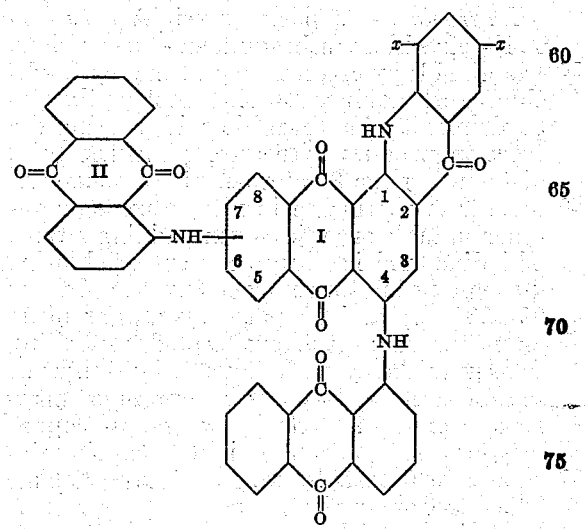

wherein the $x$'s stand for halogen atoms and in which the NH group connected with nucleus II is linked to nucleus I in 5- or 8-position, and form dark powders difficultly soluble in the usual organic solvents.

These intermediate products are transformed into especially valuable vat dyestuffs by subjecting same at elevated temperature to the action of suitable ring closing agents, such as aluminium chloride, aluminium-chloride/pyridine, aluminium chloride/sodium chloride, etc.

The new vat dyestuffs thus obtainable probably correspond to the general formula:—

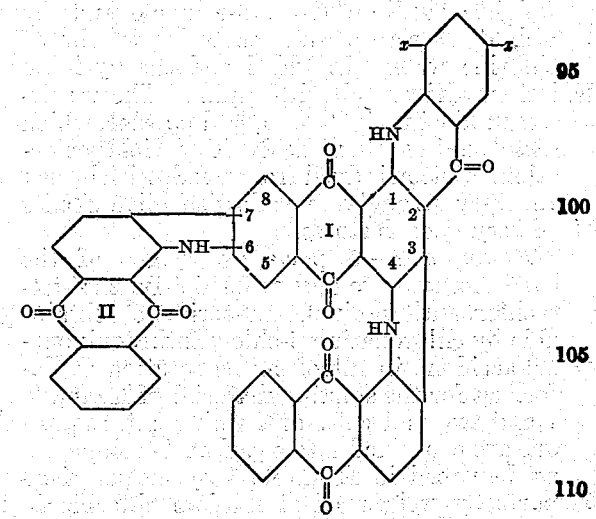

wherein the $x$'s mean halogen atoms and the nucleus II is linked to the nucleus marked I in 5(NH)-6-position or in 8(NH)-7-position. They form olive colored powders nearly insoluble in the usual organic solvents, soluble in strong sulfuric acid with a violet coloration and dye cotton from an alkaline hydrosulfite vat strong olive shades of excellent fastness properties.

The following examples illustrate my invention without, however, limiting it thereto:—

*Example 1.*—50 parts by weight of 4.8-Bz-2'.4'-tetrachloroanthraquinone-1.2-acridone (obtainable by reacting upon 1 mol of 1.8-dichloroanthraquinone with 1 mol of the potassium salt of anthranilic acid, heating the reaction product with strong sulfuric acid, distributing the 8-chloroanthraquinone-acridone thus obtainable in nitrobenzene or another suitable organic solvent, adding a trace of iodine, and leading a current of chlorine through the mixture at a temperature of about 90–100° C.) and 50 parts by weight of 1-aminoanthraquinone are heated to boiling for several hours with 50 parts by weight of sodium acetate, 10 parts by weight of magnesium oxide, 2 parts by weight of copper powder and 2 parts by weight of cupric chloride in 1000 parts by weight of naphthalene. The reaction product separates in form of small fine, bluish grey needles. When the reaction is complete toluene is added, and after filtering the reaction product is boiled with dilute hydrochloric acid. It dissolves in concentrated sulfuric acid with a reddish brown coloration and on pouring into water yields corinth colored flakes.

5 parts by weight of the condensation product thus produced are heated to 120–130° C. with 20 parts by weight of aluminium chloride in 50 parts by weight of pyridine for a short time until a worked up test portion dissolves in concentrated sulfuric acid with a violet coloration. The melt is then stirred into a solution of 50 parts by weight of sodium hydroxide in 400 parts by weight of water. 100 parts by weight of chlorine water are added and the pyridine is then driven off with steam. The resulting product is an olive colored powder, which dissolves in sulfuric acid with a violet coloration. Cotton is dyed from a yellowish brown vat very strongly in yellowish olive shades of very good fastness.

*Example 2.*—5 parts by weight of the condensation product from 4.5-Bz-2'.4'-tetrachloroanthraquinone-1.2-acridone (obtainable by chloronating 5-chloroanthraquinone-1.2-acridone in nitrobenzene solution as described for the starting material of Example 1 and two molecules of 1-amino-anthraquinone are converted into a carbazole compound as described in Example 1 by means of 20 parts by weight of aluminium chloride in pyridine or in a mixture of aluminium chloride and sodium chloride. The product obtained dyes cotton from a brown vat in more reddish olive shades than the product of Example 1 and possesses the same satisfactory fastness properties.

I claim:—

1. The new vat dyestuffs of the probable general formula:—

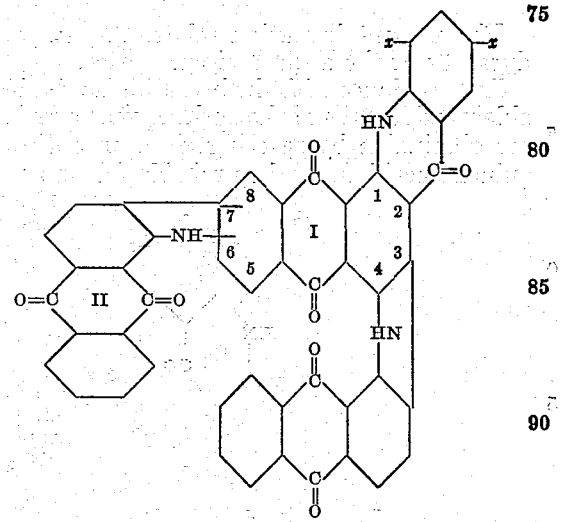

wherein the $x$'s mean halogen atoms and the nucleus marked II is linked to the nucleus marked I in 5(NH)-6-position or in 8(NH)-7-position, said dyestuffs forming olive colored powders, nearly insoluble in the usual organic solvents, soluble in strong sulfuric acid with a violet coloration and dyeing cotton from an alkaline hydrosulfite vat strong olive shades of excellent fastness properties.

2. The new vat dyestuff of the probable formula:—

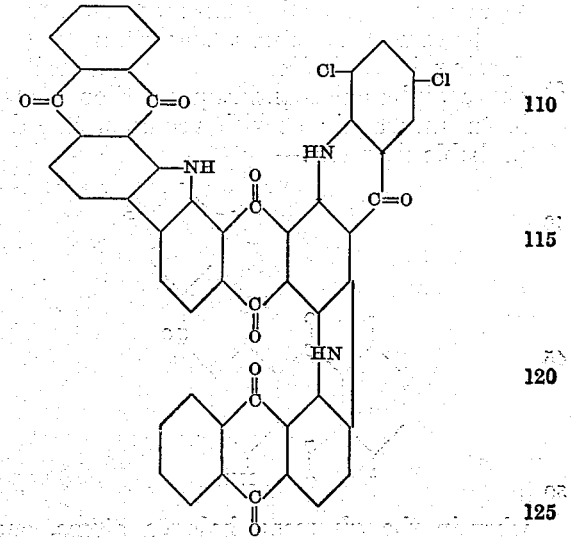

said dyestuff forming an olive colored powder, nearly insoluble in the usual organic solvents, soluble in strong sulfuric acid with a violet coloration and dyeing cotton from a yellowish brown vat strong olive shades of excellent fastness properties.

3. The new vat dyestuff of the probable formula:—

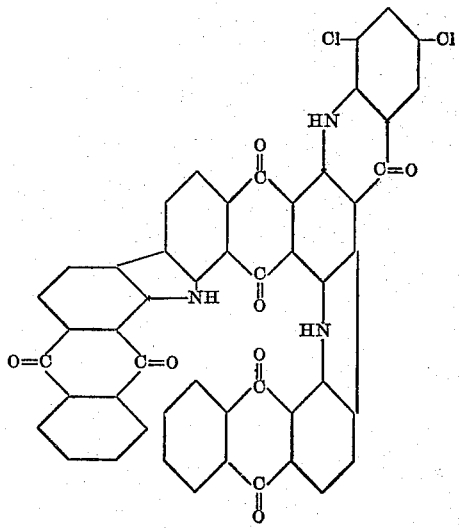

said dyestuff forming an olive colored powder, nearly insoluble in the usual organic solvents, soluble in strong sulfuric acid with a violet coloration and dyeing cotton from a brown vat olive shades of excellent fastness properties.

In testimony whereof, I affix my signature.
ROBERT BERLINER.